US012800853B2

(12) United States Patent
Dorche et al.

(10) Patent No.: US 12,800,853 B2
(45) Date of Patent: Nov. 17, 2026

(54) HIGH QUANTUM EFFICIENCY HETEROGENEOUS PHOTODETECTORS

(71) Applicants: Ali Eshaghian Dorche, Goleta, CA (US); Chong Zhang, Santa Barbara, CA (US); Yang Shen, Goleta, CA (US); Tin Komljenovic, Goleta, CA (US); Minh Tran, Goleta, CA (US); Charles Roxlo, Saratoga, CA (US)

(72) Inventors: Ali Eshaghian Dorche, Goleta, CA (US); Chong Zhang, Santa Barbara, CA (US); Yang Shen, Goleta, CA (US); Tin Komljenovic, Goleta, CA (US); Minh Tran, Goleta, CA (US); Charles Roxlo, Saratoga, CA (US)

(73) Assignee: Nexus Photonics, Inc., Goleta, CA (US)

( * ) Notice: Subject to any disclaimer, the term of this patent is extended or adjusted under 35 U.S.C. 154(b) by 316 days.

(21) Appl. No.: 18/603,555

(22) Filed: Mar. 13, 2024

(65) Prior Publication Data

US 2025/0291129 A1 Sep. 18, 2025

(51) Int. Cl.
*G02B 6/42* (2006.01)

(52) U.S. Cl.
CPC ......... *G02B 6/4214* (2013.01); *G02B 6/4215* (2013.01)

(58) Field of Classification Search
CPC ............................ G02B 6/4214; G02B 6/4215
USPC ............................................................ 385/14
See application file for complete search history.

(56) References Cited

U.S. PATENT DOCUMENTS

| | | | | |
|---|---|---|---|---|
| 9,557,484 | B1 * | 1/2017 | Norberg | G02B 6/1228 |
| 2011/0007998 | A1 * | 1/2011 | Yamamoto | G02B 6/43 156/182 |
| 2021/0273122 | A1 * | 9/2021 | Yoneda | H10F 30/2255 |
| 2024/0353729 | A1 * | 10/2024 | Sharma | G02F 1/217 |

* cited by examiner

*Primary Examiner* — Jerry M Blevins
(74) *Attorney, Agent, or Firm* — Shalini Venkatesh

(57) ABSTRACT

A device comprises first and second elements fabricated on a common substrate as a photonic integrated circuit. The first element comprises a photodetector layer comprising first and second interfaces, configured to receive incident light. The second element, at least partly butt-coupled to at least one of the first and second interfaces comprises an intermediate waveguide structure supporting an intermediate optical mode. A first portion of an optical signal guided along the intermediate waveguide structure and incident on the first interface is transmitted into the photodetector layer. A second portion of the optical signal is reflected away from the first interface to be subsequently incident on the second interface of the photodetector layer.

2 Claims, 8 Drawing Sheets

HIGH QUANTUM EFFICIENCY HETEROGENEOUS PHOTODETECTORS

FIELD OF THE INVENTION

The present invention relates to photonic integrated circuits. More specifically, certain embodiments of the invention relate to improved performance of photonic integrated circuit-based photodetectors and related components.

BACKGROUND OF THE INVENTION

A photodetector is a device that can sense light or other electromagnetic radiation. Semiconductor-based photodetectors that convert photons into electrical charge are of special interest in photonics. Photodetectors are characterized by various performance metrics including quantum efficiency (number of carriers generated per incident photon), responsivity (output current divided by total light power falling upon the detector), noise-equivalent power (amount of light needed to generate a signal comparable in size to the noise of the device), dark current (current flowing through a photodetector even in the absence of light), response time (time needed for photodetector to go from e.g. 10% to 90% of final output) and others.

In some applications, especially related to quantum effects and entangled photons, it is crucial to detect almost every photon. This requires photodetectors whose quantum efficiency approaches 100%, i.e. a charge is generated for each incident photon (for cases where there is no built-in gain in the photodetector). In well-designed semiconductor photodetectors, quantum efficiency generally depends on the ability to get light into the active region (e.g. by minimizing reflections or similar losses) and the ability of the photodetector to generate charges from photons and collect them. The latter is realized by epitaxial optimization of the photodetector characteristics related to photon capture, carrier extraction and managing internal losses (e.g. doping optimization, etc.), while the former is typically addressed by designing the photodetector to optimize how much of the light reaching the photodetector is coupled into it.

Historically, photodetectors have been realized as standalone devices, often in a so-called surface normal orientation, where performance, and more specifically quantum efficiency, can be improved by utilizing advanced coatings to reduce the magnitude of reflections at the surface of the photodetector. With advanced multilayered coatings, the reflection can be made very small over a broad wavelength range.

Stand-alone photodetectors are still commonly used in many applications, but photonics is now moving to higher levels of integration. This is facilitated using photonic integrated circuits (PICs). A PIC or integrated optical circuit is a device that integrates multiple photonic functions and as such is analogous to an electronic integrated circuit. The major difference between the two is that a photonic integrated circuit provides functions imposed on optical carrier waves.

Historically, indium phosphide (InP) and silicon (Si) have been the two platforms most widely utilized to realize PICs, with a focus on telecom and datacom markets. As photonics is starting to address multiple emerging markets such as quantum, AR/VR, sensing, healthcare, and as telecom/datacom needs yet further improved performance, there has been significant research in the development of heterogeneously integrated PIC platforms. Heterogeneous platforms utilize bonding of two or more dissimilar materials and processing them together, allowing for improved functionality and performance as we can use a differently optimized material for each needed functionality, while supporting wafer scale, scalable processing and testing.

Depending on material selections in a heterogeneous platform, there can be challenges in coupling the light between waveguides realized in different materials, especially if there is a large difference in their refractive indices. A recent approach to the problem of such coupling was presented in U.S. Pat. No. 10,641,959 B1 which employs butt-coupling in combination with a mode-converter to allow the heterogenous process to be used without the need for extremely small taper widths, that can be challenging to fabricate.

This approach enables the integration of various high-performance active components (lasers, amplifiers, modulators, photodetectors), but, due to the nature of the coupling as will be explained below, typically results in photodetectors with reduced quantum efficiency due to reflection at the interface between two materials with large difference in refractive indexes, unless a very challenging fabrication process with very precise control is carried out. In practice, this impacts variation and yield, which can limit the applicability of heterogeneous integration in cases where high quantum efficiency is necessary, such as quantum systems, various highly sensitive sensing applications, and others.

There remains a clear need to integrate photonic elements comprising very low loss materials, such as e.g. silicon-nitride (SiN) used for passive waveguides, with very high quantum efficiency photodetectors (approaching 100%) in a wafer-scale process that can address the needs of emerging systems.

The present invention is directed towards improving the state of the art of heterogeneously integrated photodetectors. In particular, embodiments described below are concerned with the detailed design of the photodetectors and coupling schemes necessary for creation of high quantum efficiency photodetectors for next generation PICs.

DETAILED DESCRIPTION

Figure 1:
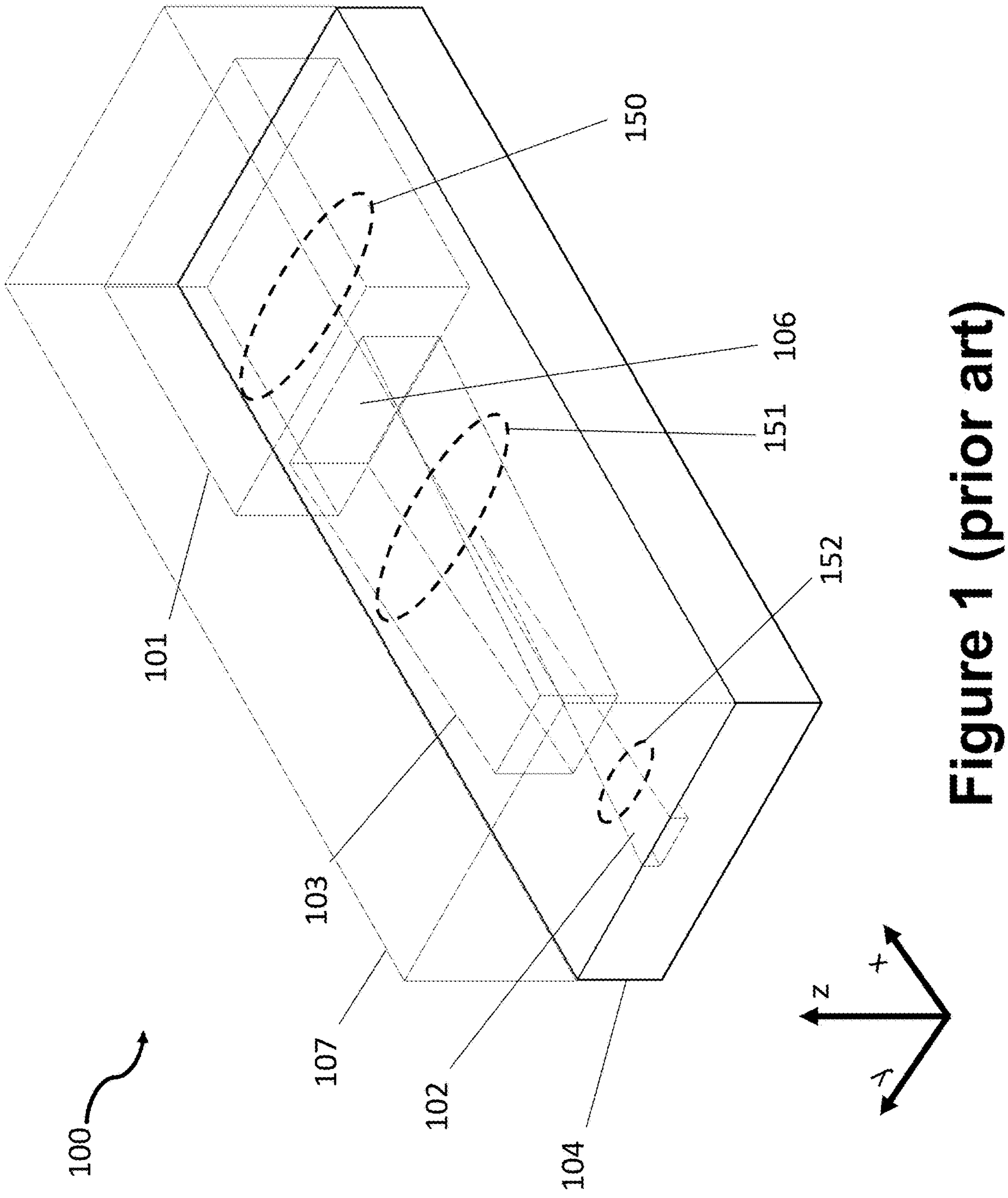
Figure 1 (prior art)
FIG. 1 (Prior Art) shows a 3D view of a prior art device.

Described herein include embodiments of heterogeneously integrated photodetectors and related components with improved quantum efficiency.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of the present invention is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, such as e.g. thin coating layer typically used to provide high-reflectivity or anti-reflectivity functionality. It should be noted that the axes of two waveguide structures or elements need not be colinear for them to be accurately described as being butt-coupled. In other words, the interface between the elements need not be perpendicular to either axis in cases e.g. this interface is angled to control the reflections at the interface. Similarly, there can be vertical or horizontal offset between surfaces, or they might not overlap fully-we call such cases partial butt-coupling while still allowing efficient coupling. No adiabatic transformation occurs between butt-coupled structures at the butt-coupled interface.

The terms "active device", "active structure" or otherwise "active" element, part, or component may be used herein. A device or a part of a device called active is capable of light generation, amplification, modulation and/or detection using electrical contacts. This is in contrast to what we mean by a "passive device" whose principal function is to confine and guide light, and/or provide splitting, combining, filtering and/or other functionalities that are commonly associated with passive devices. Some passive devices can provide functions overlapping with active device functionality, such as e.g. phase tuning implemented using thermal effects or similar that can provide modulation. No absolute distinction should be assumed between "active" and "passive" based purely on material composition or device structure. A silicon device, for example, may be considered active under certain conditions of modulation, or detection of low wavelength radiation, but passive in most other situations.

FIG. 1 (prior art) shows a 3D view of a heterogeneously integrated photodetector as described in e.g. U.S. Pat. No. 10,641,959 B1. The illustrative 3D view includes a bottom cladding layer 104 and top cladding layer 107 that provide cladding functionality to at least one of the waveguides for which layers 102, 103 or 101 provide the core. In some embodiments, multiple materials can provide cladding, i.e. layers 104 and 107 can comprise sublayers. Layer 101 is the active structure that in some embodiments is a semiconductor photodetector, and layer 102 is a passive structure that in some embodiments is a passive waveguide. Efficient coupling between optical mode 152, supported by a waveguide for which layer 102 provides the core, and optical mode 150, for which layer 101 provides the core, is facilitated by layer 103 (described below).

In some embodiments, layer 102 can comprise at least one of SiN, silicon-oxynitride (SiNOx), titanium-dioxide (TiO2), tantalum-pentoxide (Ta2O5), (doped) silicon-dioxide (SiO2), lithium-niobate (LiNbO3), lithium-tantalate (LiTaO3), rubidium-titanyl-phosphate (RTP), aluminum-nitride (AlN) or other suitable materials. In some embodiments, layer 102 as a core of the waveguide, and layers 104 and 107 as cladding of the waveguide form a waveguide whose effective mode refractive index is smaller than 2.2.

In some embodiments, layer 101 comprises at least one of InP and InP-based ternary and quaternary materials, gallium-arsenide (GaAs) and GaAs based ternary and quaternary materials, gallium-nitride (GaN), gallium-phosphide (GaP), indium-arsenide (InAs) and indium-antimonide (InSb) and their variations and derivatives. In other embodiments, layer 101 comprises at least one of Si and germanium (Ge). In all cases, as heterogeneous integration includes bonding of layer 101, layer 101 can be grown on a native or growth optimized substrate resulting in lower dislocation densities and better performance (e.g. lower dark currents) than if layer 101 were to be grown on e.g. Si in the case of Ge or III-V layers.

Layer 103 serves as an intermediate waveguide that gradually transfers the optical mode profile 152 to optical mode profile 151 utilizing tapers in at least one of layers 102 and 103, and then efficiently couples the optical mode 151 to optical mode profile 150 using butt-coupling approach at interface 106. The dimensions of layer 103 at the interface 106 are optimized to maximize the mode overlap between the modes supported in layer 103 and layer 101 respectively at the interface. The use of intermediate layer 103 significantly improves efficient transfer between high refractive index materials (101) and low refractive index materials (102), significantly reduces the stringent requirements on taper tip width and allows for vertical offset (in the z-direction shown) between optical modes 152 and 150. See also FIG. 2 for additional clarity where optical mode 152 corresponds to optical mode 252 and optical mode 150 corresponds to optical mode 250.

Figure 2:
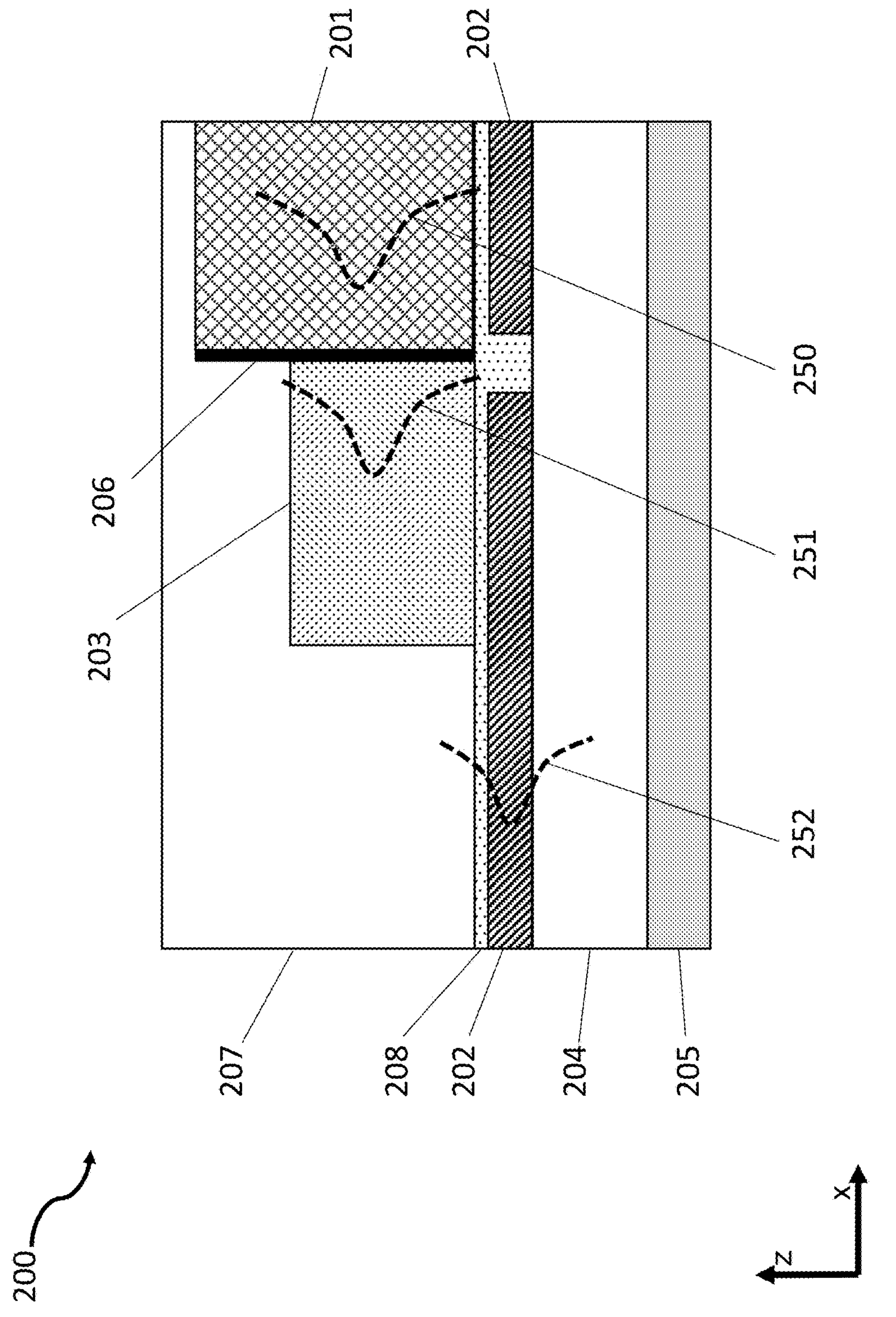
Figure 2 (prior art)
FIG. 2 (Prior Art) shows a cross-section view of a prior art device.

FIG. 2 (prior art) is a schematic cross-section view of an integrated photonic device 200 utilizing butt-coupling and mode conversion for efficient coupling between dissimilar materials. Functional layers 201 to 207 (unless explicitly defined differently) correspond to functional layers 101 to 107 as described in relation to FIG. 1, and optical modes 250 to 252 correspond to optical modes 150 to 152 as described in relation to FIG. 1. Layer 205 is a substrate that can be any suitable substrate for semiconductor and dielectric processing, such as Si, InP, GaAs, quartz, sapphire, glass, GaN, silicon-on-insulator or other materials known in the art.

Optional layer 208 serves to planarize the patterned surface of layer 202, providing a planar surface on which layers 201 and 203 can be bonded or deposited. In some embodiments the planarization may be controlled to leave a thin layer 208 on top of the layer 202 (as shown in FIG. 2), or to remove all material above the level of the top surface of the layer 202 (not shown).

Layer 206 is optional, and primarily serves as either an anti-reflective (AR) or a highly reflective (HR) coating at the interface between layer 201 and layer 203. In cases where the optical signal travels from left to right in the orientation shown in FIG. 2, and is to be coupled from waveguide 202 (optical mode 252) to a photodetector realized in layer 201 (optical mode 250) using intermediate waveguide 203 it would be beneficial to utilize layer 206 as an anti-reflective coating at the butt-coupled interface, to improve the quantum efficiency of the photodetector, as will be described in more detail with the help of FIG. 3. This can be challenging as the deposition of layer 206 typically happens during the semiconductor processing on a wafer scale, where the layer 206 has to be deposited on an etched vertical surface with very good thickness control. In practice, achieving such thickness control when depositing material onto a sidewall in a wafer-scale process is much harder than in the case of stand-alone, surface-normal photodetectors, where high-performance coatings are often utilized. So, optimizing reflection using AR coatings on surfaces perpendicular to the wafer plane in prior art PICs with heterogeneously integrated photodetectors is very difficult.

Figure 3:
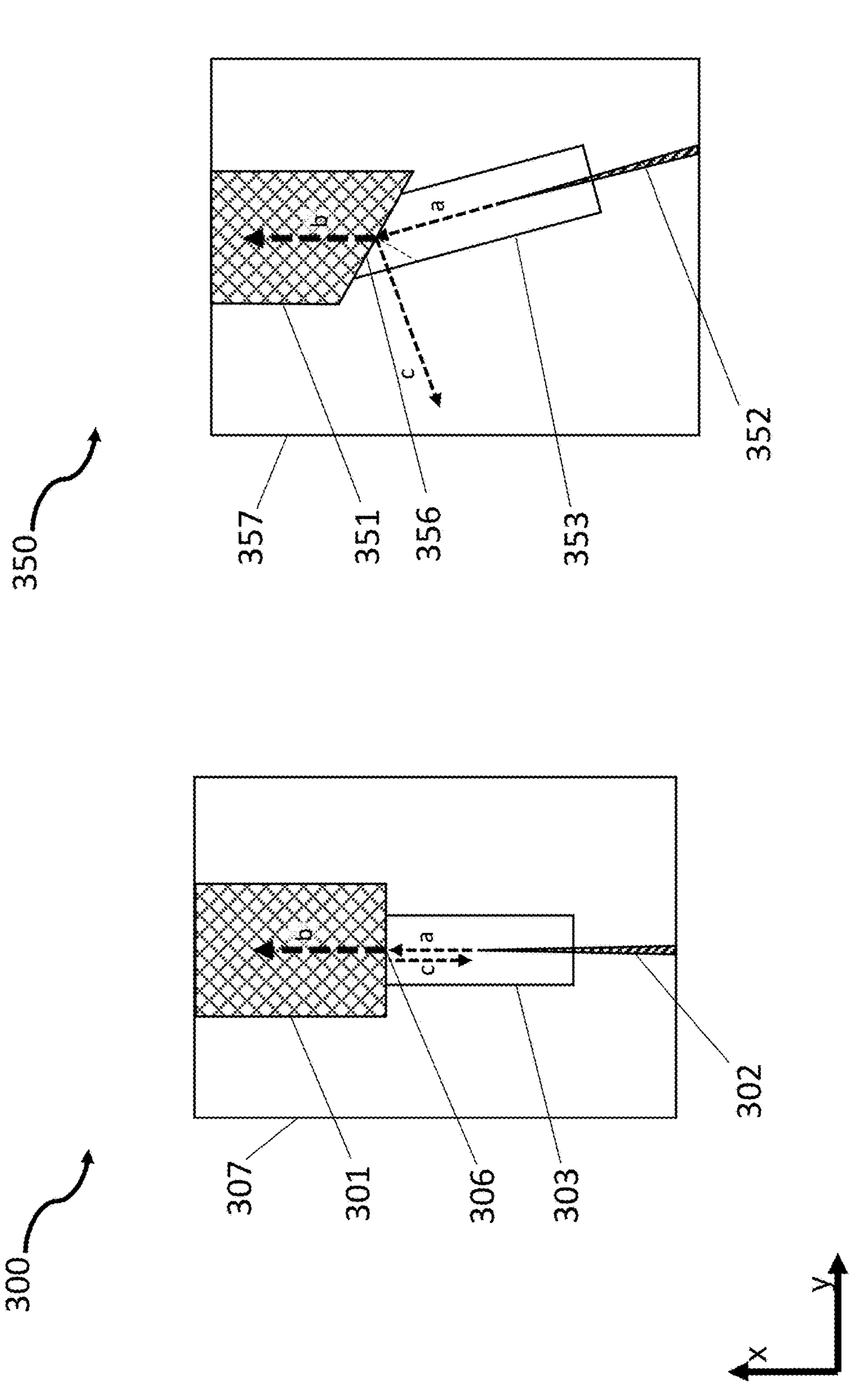
Figure 3 (prior art)
FIG. 3 (Prior Art) shows a top-down view of a prior art devices.

FIG. 3 (prior art) shows two top-down schematic cross-section views, 300 and 350, of integrated photonic devices which each utilize butt-coupling and mode conversion for efficient coupling between dissimilar materials.

View 300 shows the case of a straight facet (meaning a facet perpendicular to the optical axes of the waveguides on each side of that facet) at the butt-coupling interface 306. In this case, an optical signal from waveguide core 302 (corresponding to waveguides 102 and 202 as described in relation to FIGS. 1 and 2) is coupled to waveguide core 303 (corresponding to waveguides 103 and 203 as described in relation to FIGS. 1 and 2) using tapers in at least one of the waveguide cores (in the case shown, 302 is clearly tapered), before it is butt-coupled at interface 306 to a waveguide core realized in layer 301 (corresponding to waveguides 101 and 201 as described in relation to FIGS. 1 and 2). At the butt-coupled interface 306, due to the difference in refractive indices of the modes supported by waveguide cores in 301 and 303 respectively, only part of the incident optical signal (a) is transferred to layer 301 as optical signal (b), while part is reflected back into layer 303 as optical signal (c). This has two results. The first is the reduction of transmission to layer 301 to less than 100%, which in turn means, if layer 301 is an active photodetector layer, the reduction of the photodetector's quantum efficiency, while the second is that at least some of the light reflected back into waveguide core 303 continues back into waveguide core 302, which can impact other devices on the PIC. Layer 307 is a cladding layer, that can comprise multiple sublayers.

View 350 shows an improved embodiment in which the facet at butt-coupled interface 356 is angled with respect to the optical axes of the waveguides, to prevent the back reflected light (c) from propagating back through the waveguide core 353 and in turn waveguide core 352, thus limiting the impact on other components on the PIC. However, this angling does not increase the light (b) transmitted into waveguide core 351. Here 351 to 357 correspond to same functional layers as 301 to 307 as described in relation to view 300.

In an illustrative case where the refractive index of layer 301 is ~3.5, and the refractive index of layer 303 is ~2, the =reflection at interface 306/356 is approximately 7.5% which directly limits the transmission and consequently the quantum efficiency of the photodetector to 92.5%, even if there are no losses associated with either photon capture or carrier transport inside the photodetector. Full-wave simulations can be used to calculate the exact reflection depending on the choice of materials, angle at the interface and also fabrication variations and imperfections (non-perfect angles, roughness, voids/gaps). Note that angling generally does not increase the transmission but just changes the direction of the reflection. As discussed above, the use of an AR coating could improve the transmission efficiency, but it is generally very challenging to apply high-quality AR coatings on etched facets that are perpendicular to the plane of the wafer.

Figure 4:
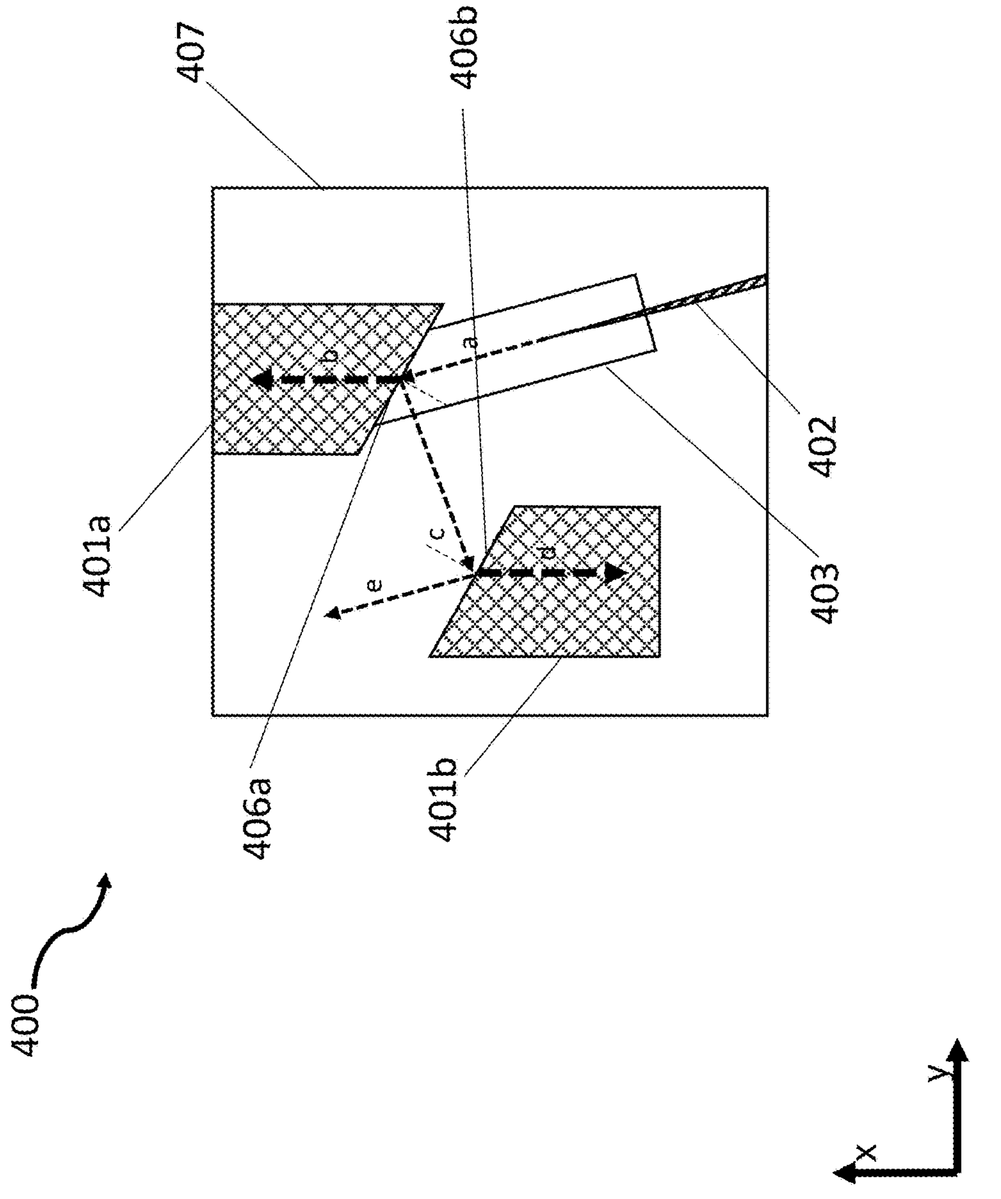
FIG. 4 shows a top-down view of a device according to some embodiments of the present invention.

FIG. 4 is a schematic top-down view 400 of part of an integrated photonic device showing one embodiment of an improved quantum efficiency heterogeneous photodetector. Layers 402 to 407 correspond to layers 302 to 307 (unless explicitly defined differently) as described in relation to FIG. 3. In the shown embodiment, the photodetector layer corresponding to layer 301 comprises two separated portions (401*a* and 401*b*), each with a butt-coupling interface (or facet). These interfaces are arranged in such way that the reflection from first interface 406*a* is subsequently incident on second interface 406*b*. The redirection of reflected light from one interface to another can be continued in other embodiments (not shown) by adding a third interface placed such that reflection (e) from the second interface is incident on that third interface, and so on, cascading as many more interfaces as desired. Note that FIG. 4 shows only key transmitted/reflected beams, e.g. the beam reflected from interface 406*a* will suffer some reflection and refraction losses at the boundary between layers 403 and 407 before reaching interface 406*b* there, but as the refractive index difference is smaller than that between layers 403 and 401*a*, the reflected and refracted beams are correspondingly weak, and not shown, while the transmitted beam (c) is.

At each key interface (406*a*, 406*b* in the embodiment shown in FIG. 4), part of the power is transmitted to the corresponding photodetector layer (401*a*, 401*b*), at roughly the same transmission efficiency, so, in the case of the materials discussed above with respect to FIG. 3, the first photodetector layer 401*a* could capture 92.5% of incident power (a) as power (b), while the second photodetector layer 401*b* could capture close to 92.5%[1] of the reflected power (c) which corresponds to 7.5% of incident power (a). The second photodetector layer could therefore capture up to ~6.9% of incident power (a) as power (d). Both layers combined can therefore capture (b)+(d), corresponding to ~99.4% of the incident power (a) (ignoring the propagation, scattering and divergence losses that are optimized separately). Adding a third photodetector layer interface (not shown) the capture efficiency of the combined, three-facet structure could reach 99.96%, a value that would be very challenging to achieve with wafer-scale coatings, especially if the incident signals are broadband. The angles of the interfaces required can be optimized in a straightforward way by using either analytical expressions, or, preferably, full-wave simulators, to minimize the back-reflection into the input waveguide core 402 and maximize the amount of reflected signal from each butt-coupling interface that is incident on the next (e.g. reflection from 406*a* to 406*b*). In the embodiment shown in view 400, the intermediate waveguide structure is utilized only at the first butt-coupled interface and the optical mode then diffracts following laws of reflection, refraction and diffraction, but various other arrangements can be designed as will be described with the help of FIGS. 5 and 6.

[1] The exact figure would be less than 92.5% partly because of losses at the interface between 403 and 407 mentioned above, but in all cases, as at least part of the light reflected from interface 406*a* will reach interface 406*b* as beam (c), more light will be captured than if photodetector layer 401*b* were not present, increasing responsivity (capture efficiency)

Figure 5:
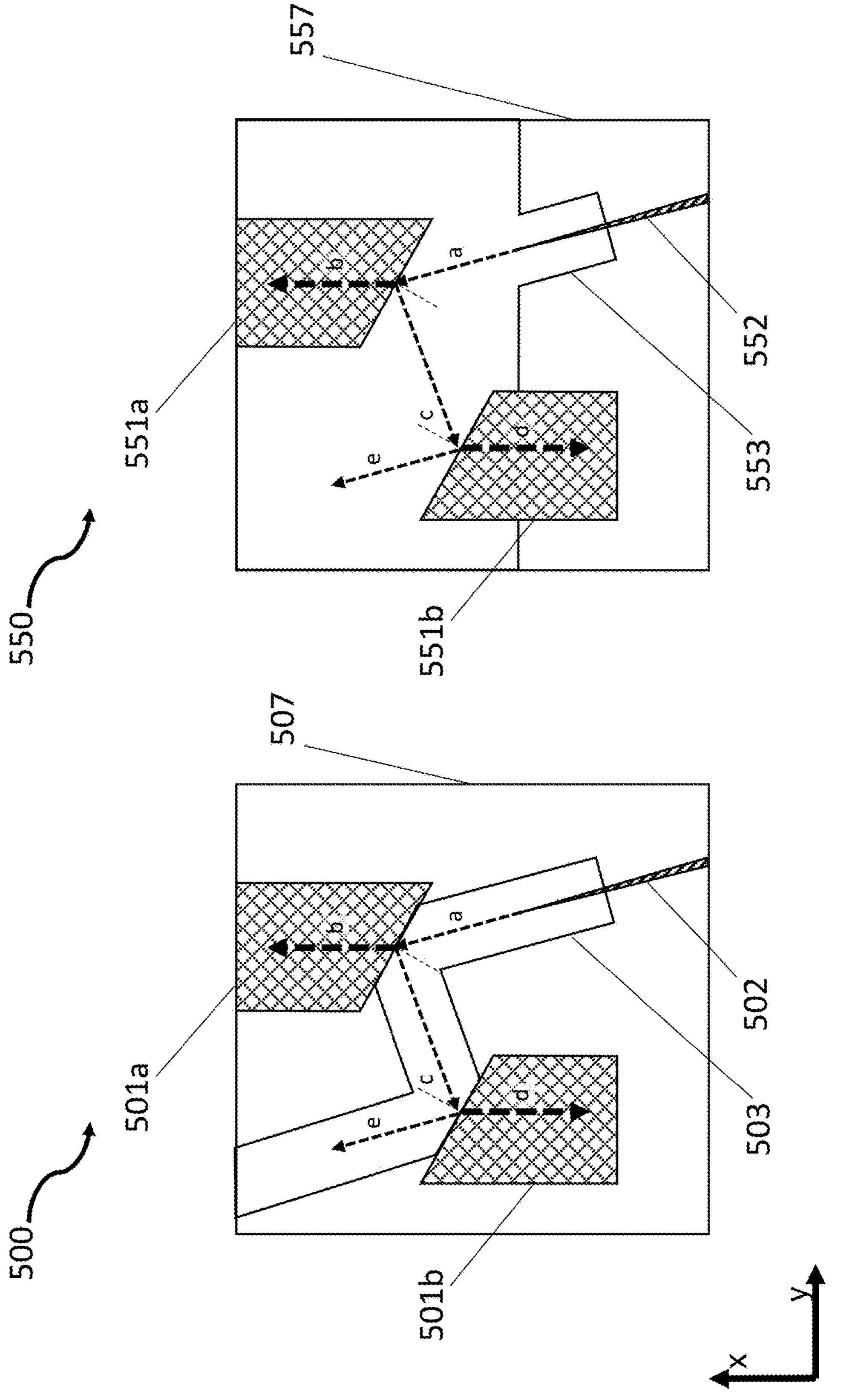
FIG. 5 shows two top-down views of devices according to some embodiments of the present invention.

FIG. 5 shows schematic top-down views 500 and 550 of part of an integrated photonic device. View 500 shows an embodiment utilizing an intermediate waveguide structure (503) that guides light to each of two butt-coupled interfaces (though in related unshown embodiments the number could be greater than two), and view 550 shows an embodiment utilizing an intermediate slab structure (553) in contact with two butt-coupled interfaces (though in related unshown embodiments the number could be greater than two).

In the embodiment shown in view 500, layers 501 to 507 of the integrated photonic device correspond to layers 401 to 407 (unless explicitly defined differently) as described in relation to FIG. 4. The use of the intermediate waveguide structure, as shown in view 500, enables better guiding of the reflected optical signals, potentially increasing the efficiency of the whole system by reducing diffraction losses and also losses at e.g. interface between layers 403 and 402 that beam (c) experiences as described in relation to FIG. 4. In such embodiments, the diffraction is controlled in two dimensions via the waveguides formed in layer 503.

In the embodiment shown in view 550, an intermediate waveguide structure 553, begins with a standard waveguide geometry (such as a buried channel waveguide) to first couple light from waveguide core 502 into its own core, but then transitions to a slab geometry. In both cases shown in FIG. 5, the use of an intermediate waveguide structure not just at the first interface but also between that and the second interface, and even beyond enables better guiding of the reflected optical signals (c) and (e) than is possible in the case shown in FIG. 4, potentially increasing the efficiency of the whole system by reducing diffraction losses. In the embodiment shown in view 550, the diffraction is controlled in one of the axes (z-direction, not visible in this cross-section), while the mode still diffracts laterally (x/y direction, depending on the Poynting vector of the optical field). At the same time, in some cases, the embodiment shown in view 550 can provide lower propagation losses in layer 553 (compared to layer 503 in view 500) as slab modes can have lower loss than waveguide modes that also experience sidewall roughness. Layers 551 to 557 correspond to layers 501 to 507 (unless explicitly defined differently) as described in relation to FIG. 5.

In all cases shown in FIGS. 4 and 5, the photodetector layers (401*a/b*, 501*a/b*, 551*a/b*) providing butt-coupling interfaces can be connected electrically to form a single response element converting incident photons to electrons. In other embodiments, each photodetector layer (401*a/b*, 501*a/b*, 551*a/b*) can have a separate electrical receiver which can provide lower dark current noise, while enabling us to detect same amount of signal current. This effect is pronounced in embodiments which utilize nonlinear receivers, such as in photon counting applications. Furthermore, the two layers can be optimized to have different dark currents, e.g. the second photodetector layer can be smaller in size to reduce its dark current as it will typically be used to detect lower signal levels (the reflection received from the first photodetector being a small fraction of the light received by the first photodetector).

Figure 6:
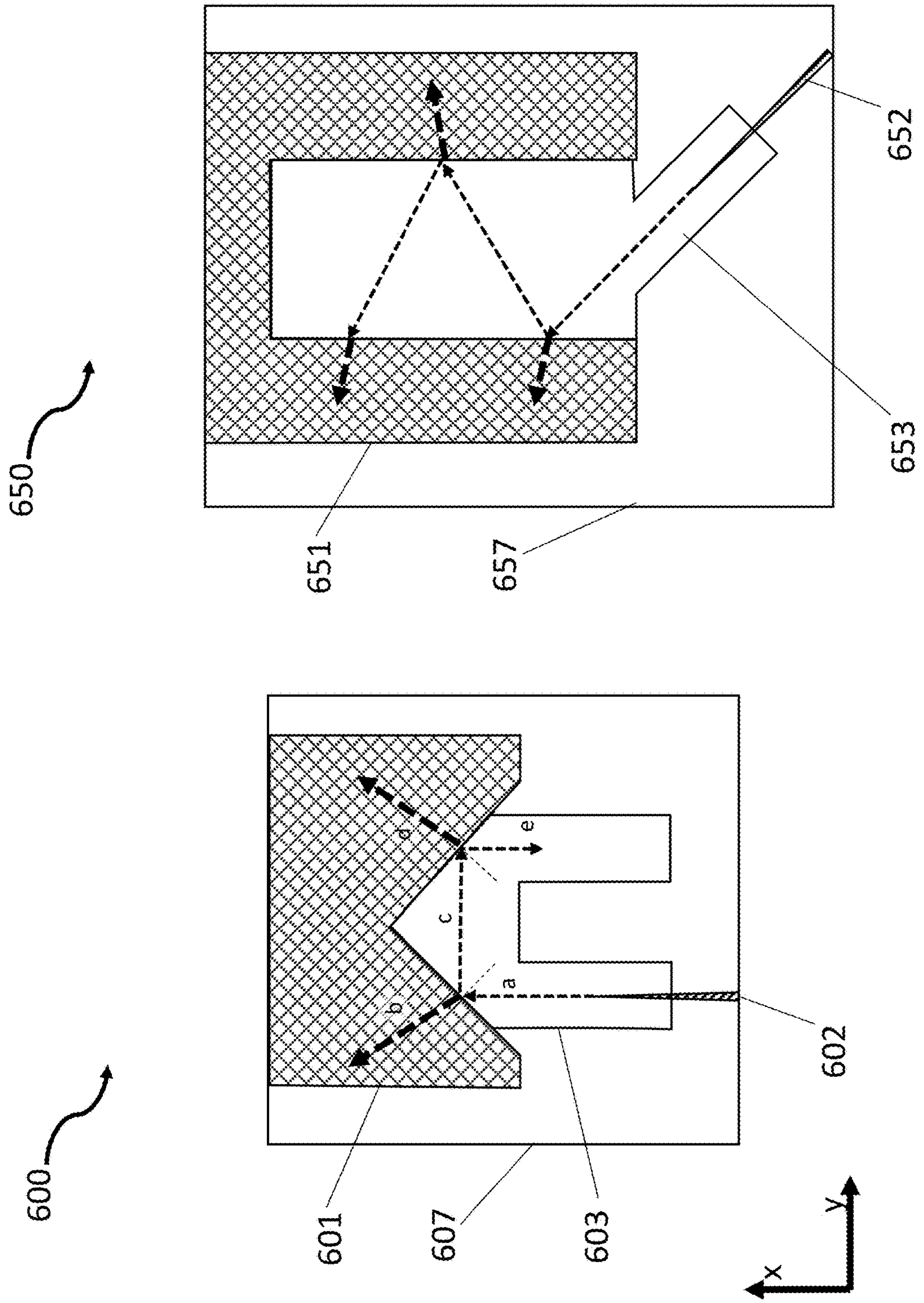
FIG. 6 shows two top-down views of devices according to some embodiments of the present invention.

FIG. 6 shows two schematic top-views 600 and 650 of parts of integrated photonic devices in which a single photodetector layer portion 601/651 has more than one butt-coupling interface. In embodiments such as that shown in view 600, the shape of the angled interface can be designed such that incident optical signal is reflected from a first facet of photodetector layer 601 and is then incident at a second facet of the same photodetector layer 601. Similarly, in embodiments such as that shown in view 650, the photodetector layer can be designed such that light experiences multiple bounces at one or more facets of 651, using more elaborate photodetector layer structures.

Layers 601 to 603 correspond to layers 401/551 to 403/553 (unless explicitly defined differently) as described in relation to FIGS. 4 and 5. Similarly, layers 651 to 653 correspond to layers 401/551 to 403/553 (unless explicitly defined differently) as described in relation to FIGS. 4 and 5. In the cases of more elaborate photodetector layer structures, the shape of the photodetector layer has to be optimized such that quantum efficiency is maximized by additional coupling interfaces, but at the same time adding more interfaces can result in increased dark currents, as there are more sidewalls/etched surfaces in the photodetector layer. In many embodiments, just adding a second butt-coupled interface sufficiently improves the quantum efficiency without significantly increasing dark current.

Figure 7:
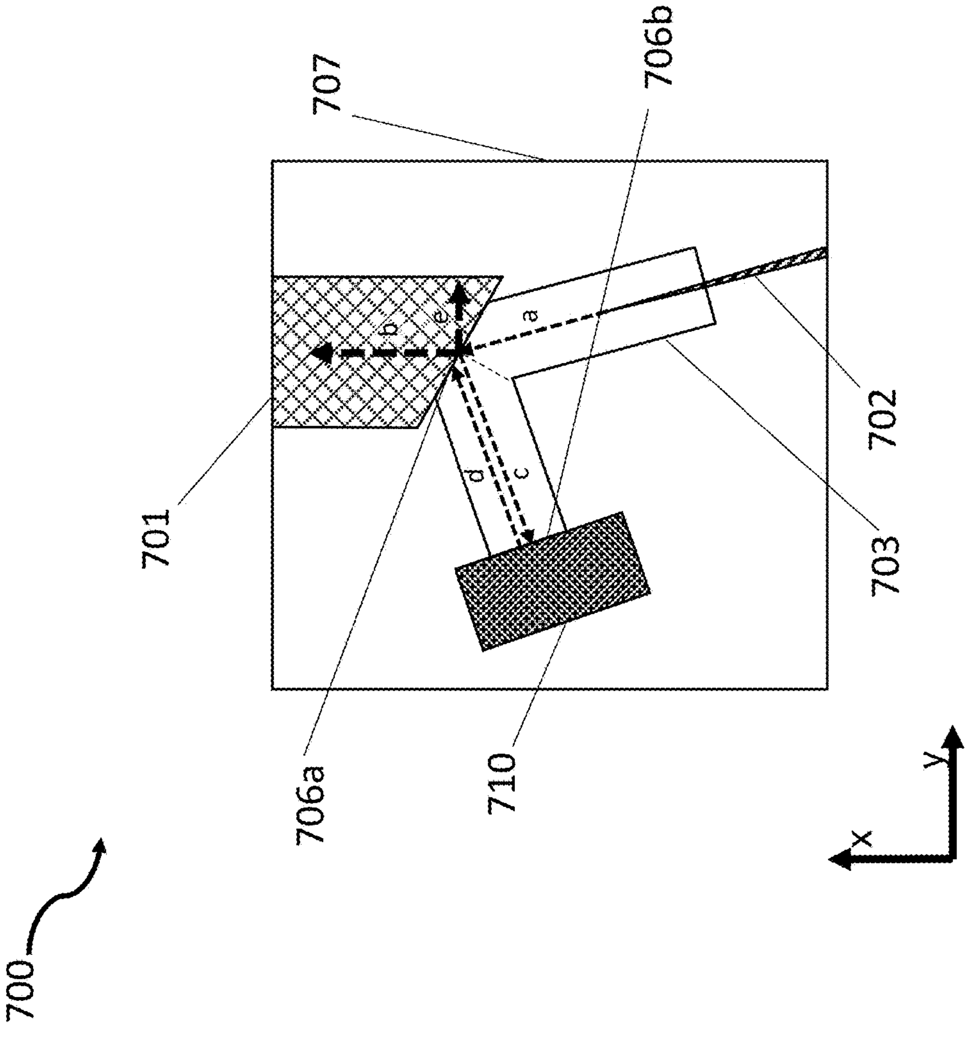
FIG. 7 shows a top-down view of a device according to some embodiments of the present invention.

FIG. 7 shows a schematic top-view of an integrated photonic device 700 in which a single photodetector layer 701 with a butt-coupled interface 706*a* also makes use of an external reflector 710 with reflecting interface 706*b*, allowing at least two chances to capture light from the incident optical signal, first capturing light directly from incident beam (a), next from incident beam (d), resulting in improved photon capture via transmitted beams (b) and (e). Reflector 710 can be any reflective surface, and in some embodiments, it is a metal layer such as aluminum (Al), gold (Au), silver (Ag), copper (Cu), tungsten (W) or others. A benefit of using metals for reflectors is their broadband response. In some embodiments, the reflectivity of reflector 710 is at least 25%. Layers 701 to 707 correspond to layers 401 to 407 (unless explicitly defined differently) as described in relation to FIG. 7. Metal can be designed to reflect the incident beam (c) towards the same facet of the photodetector layer via beam (d) as shown in FIG. 7 but can also be designed to reflect towards another facet of the same photodetector layer (not shown) or a facet of yet another photodetector layer (not shown). In some embodiments, the reflector can have a curved surface (not shown) that can provide focusing and collimating of the incident beams in case they are not confined in both axes perpendicular to direction of propagation (e.g. propagating through a slab waveguide that provides only vertical guiding as described with the help of FIG. 5)

Note that in some embodiments, the photodetector can comprise a waveguide structure, effectively providing a waveguide coupled photodetector supporting optical modes 150/250, but in other embodiments the photodetector does not have to provide a waveguide structure and can effectively just absorb the diffracting optical modes that are butt-coupled at the interface. In yet other embodiments, curved structures can be used to collimate and shape the optical beams, especially in cases where slab modes are used. Curved structures can be defined in metal reflectors (as described above) but can also be defined in photodetector layers and butt-coupled interfaces.

Figure 8:
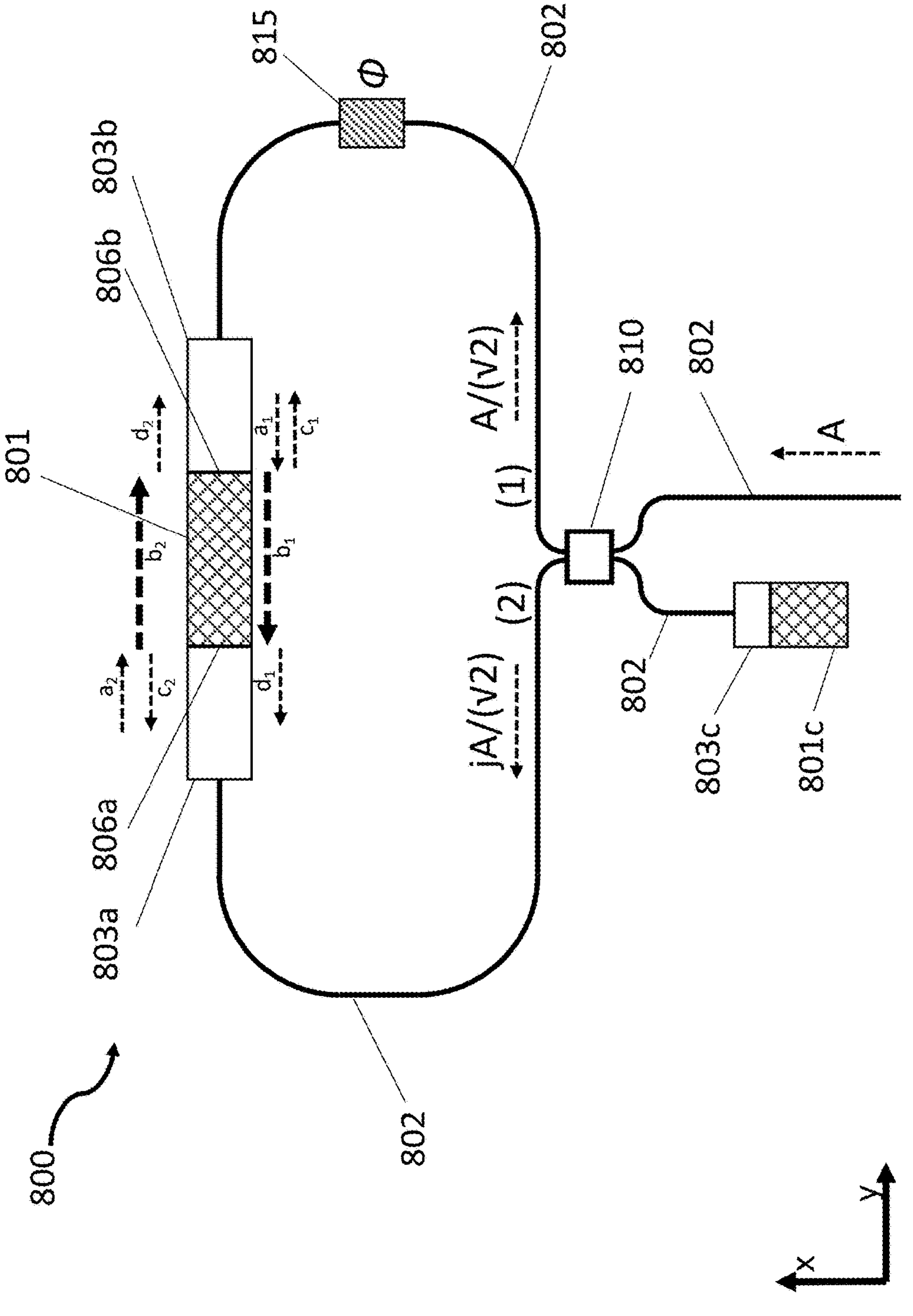
FIG. 8 shows a top-down view of a device according to some embodiments of the present invention.

FIG. 8 is a schematic top-view of an integrated photonic device 800 showing one embodiment of an improved quantum efficiency heterogeneous photodetector utilizing two butt-coupling interfaces 806*a* and 806*b*.

The device 800 splits the incoming optical signal described by optical field (A) into two substantially equal parts via a splitter structure 810. Part (1) travels counterclockwise, and part (2) travels clockwise arriving at intermediate structures 803*a* and 803*b* respectively, that transform the mode (similarly to intermediate structures 103/203/303/353/404/503/553/603/653) to a mode that is then butt-coupled to photodetector layer 801 using interfaces 806*a*/806*b*. Each of the parts has an optical field corresponding to $A/\sqrt{2}$ of the incident field, and there is typically a pi phase difference between them—e.g. if splitter structure 810 is a 50:50 directional coupler or a multi-mode interference coupler. The exact phase shift relationship can depend on the type of the splitter structure. Signal (a1), incident at facet 806*b* from the right side (counterclockwise), is partly transmitted as (b1) into the photodetector and is partly reflected back as (c1) from interface 806*b*. Similarly, signal (a2) incident at facet 806*a* from the left side (clockwise) is partly transmitted as (b2) into the photodetector and is partly reflected back as (c2). The signals (b1) and (b2) that are transmitted into photodetector 801 are partly absorbed in the photodetector, as photons are converted to electrons. The part that is not absorbed is transmitted forward to the intermediate structure on the opposite side to that from where the signal entered the photodetector-signal (d1) originating from input signal (a1) and signal (d2) corresponding to input signal (a2). The photodetector shown on FIG. 8 provides improved quantum efficiency by using phase and amplitude control of the signals (d1) and (d2) that have passed through the photodetector to cancel reflections (c1) and (c2). The phase relationship is controlled via a phase shifter 815 (one of which is shown; unshown embodiments may have more than one), while the amplitude relationship is controlled by the design of the photodetector and the bias applied to the photodetector, where larger reverse bias corresponds to larger attenuation. By matching the amplitudes of (c1) and (d1), and (c2) and (d2) via photodetector bias and matching the phases within each pair to be 180° out of phase via phase shifter 815, we can cancel the reflections at the interfaces 806*a*/806*b* using destructive interference. Additional monitor photodetector 801*c* coupled to the remaining port of the splitter 810 via intermediate structure 803*c* can be used to monitor the amount of back-reflection from photodetector 810 and provide control signals to adjust both phase shifter 815 and reverse bias of the photodetector 801. Once reflections are cancelled, the quantum efficiency of the photodetector is maximized.

The embodiments described above employ the use of an intermediate waveguide to improve coupling efficiency between a passive waveguide and at least one interface of a photodetector layer. This is particularly beneficial where the materials composing the input waveguide have refractive indices very different from those of the photodetector layer and where a photodetector layer is bonded above the passive waveguide, as discussed for example in U.S. Pat. No. 10,641,959. However, devices that use just a single waveguide to deliver light to a photodetector layer rather than a sequence of two waveguides could also benefit in terms of improved quantum efficiency by using the approaches presented in this disclosure, either using multiple butt-coupled interfaces, as shown in FIGS. 4-6, or using a reflector to return light to a single butt-coupled interface as shown in FIG. 7. In such embodiments, the single waveguide structure could be deposited after bonding the photodetector layer, similarly to the way an intermediate waveguide structure is bonded, as described in U.S. Pat. No. 10,641,959.

Also, it should be appreciated that embodiments may be envisaged that combine the use of a reflector such as element 710 with any of the photodetector and waveguide arrangements shown in FIGS. 4-6

For the purpose of the present disclosure, the term "interface" when used without another qualifying adjective should be understood mean "butt-coupled interface" as described above. Other interfaces will be specifically called out, e.g. a reflecting interface as described in relation to FIG. 7. It is to be understood that these illustrative embodiments teach just several examples of heterogeneously integrated photodetectors utilizing present invention and many similar arrangements can be further envisioned. Furthermore, such photodetectors can be combined with multiple other components to provide additional functionality or better performance such as various filtering elements, amplifiers, monitor photodiodes, modulators and/or other photonic components.

Embodiments of the present invention offer many benefits. The integration platform enables scalable manufacturing of PICs made from multiple materials providing higher-performance and/or ability to operate in particular wavelength range while providing improved quantum efficiency.

It should be noted that this invention is particularly beneficial for high quantum efficiency photodetectors and systems, where in some embodiments quantum efficiency is >90%, and in other embodiments quantum efficiency can be >95%.

This present invention utilizes a process flow consisting of typically die/wafer-bonding of a piece of compound semiconductor material on a carrier wafer with dielectric waveguides and subsequent semiconductor fabrication processes as is known in the art of heterogeneous photonics. It enables an accurate definition of optical alignment between active and passive waveguides via typically photo lithography step, removing the need for precise physical alignment. Said photo lithography-based alignment allows for scalable manufacturing using wafer scale techniques.

Embodiments of the optical devices described herein may be incorporated into various other devices and systems including, but not limited to, various computing and/or consumer electronic devices/appliances, industrial systems, communication systems, medical devices, sensors and sensing systems, quantum systems and other areas that can benefit from high performance photodetectors.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A device comprising:

a first element comprising a photodetector layer having a first interface and a second interface, each of the first and second interfaces configured to receive incident light;

a second element, at least partly butt-coupled to at least one of the first and second interfaces of the first element, the second element comprising an intermediate waveguide structure supporting an intermediate optical mode; and a third element comprising a passive waveguide structure supporting a first optical mode;

wherein a tapered waveguide structure in at least one of the second and third elements facilitates efficient adiabatic transformation between the first and intermediate optical modes;

wherein a first portion of an optical signal guided along the intermediate waveguide structure and incident on the first interface of the photodetector layer is transmitted into the photodetector layer;

wherein a second portion of the optical signal is reflected away from the first interface to subsequently incident on the second interface of the photodetector layer;

wherein first and second elements are fabricated on a common substrate as a photonic integrated circuit;

wherein the photodetector layer comprises an active waveguide structure supporting a second optical mode;

wherein the third element comprises a splitter structure configured to split the optical signal guided along the passive waveguide structure into two substantially equal first and second parts, each part subsequently being incident on a corresponding one of the first and second interfaces of the photodetector layer;

wherein a fourth element coupled to the third element provides phase shifting capability to at least one of the parts of the optical signal; and wherein each of the photodetector layer and the phase shifter is controlled to minimize back-reflection from the first and second interfaces of the photodetector layer.

2. The device of claim 1, additionally comprising a monitor photodetector coupled to the splitter structure;

wherein device performance is optimized by minimizing photocurrent at the monitor photodetector.

* * * * *